March 6, 1934.  R. D. MERSHON  1,949,871
ELECTRODE OR TERMINAL FOR ELECTROLYTIC APPARATUS
Filed March 18, 1933  2 Sheets-Sheet 1
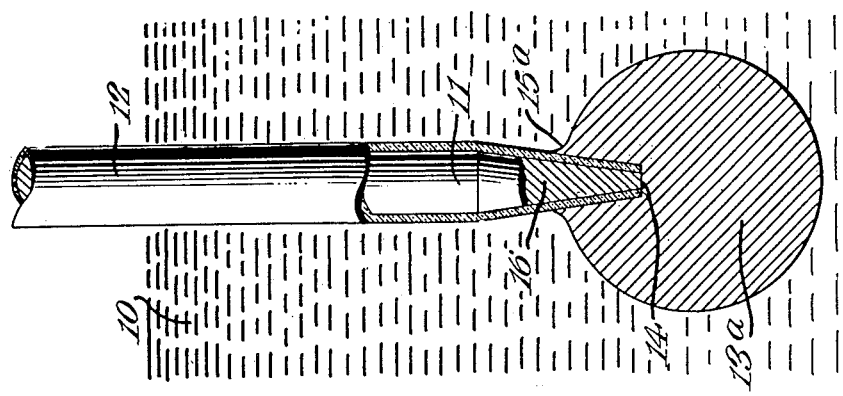
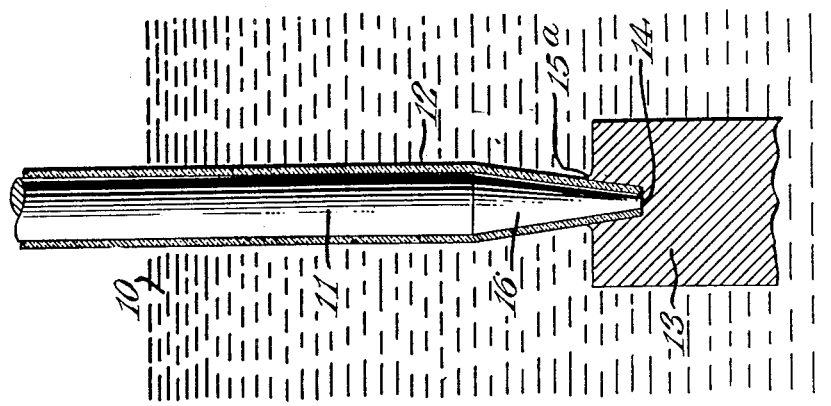
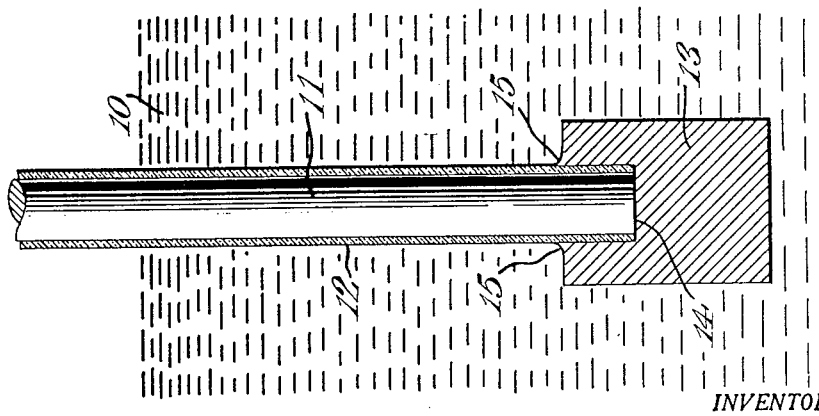
INVENTOR.
Ralph D. Mershon
BY Cooper, Kent & Dunham
ATTORNEYS.

March 6, 1934.    R. D. MERSHON    1,949,871
ELECTRODE OR TERMINAL FOR ELECTROLYTIC APPARATUS
Filed March 18, 1933    2 Sheets-Sheet 2
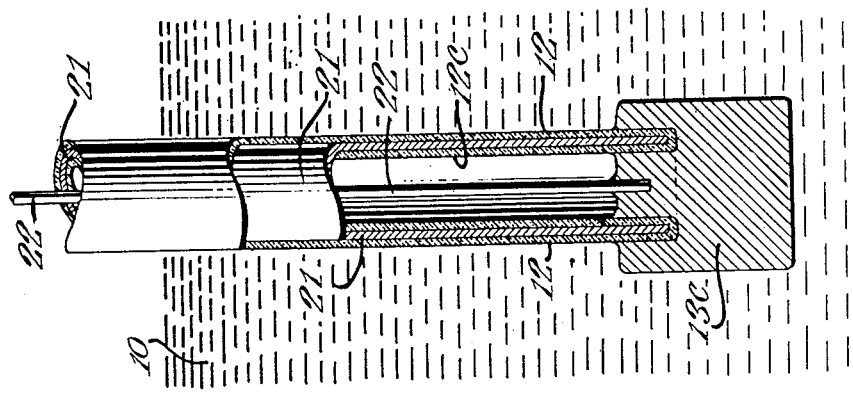
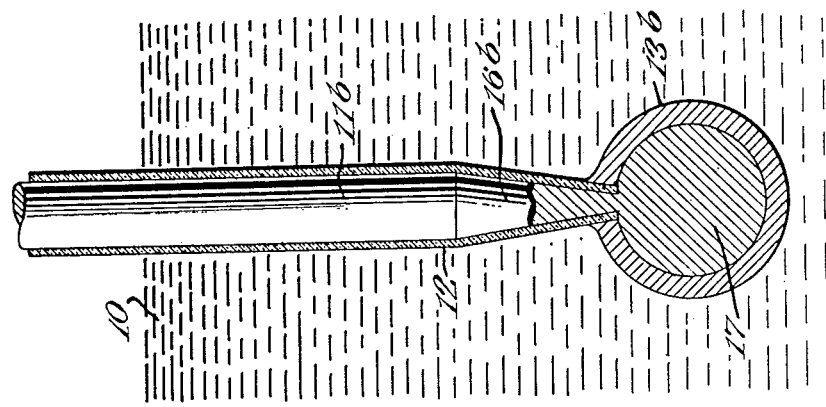
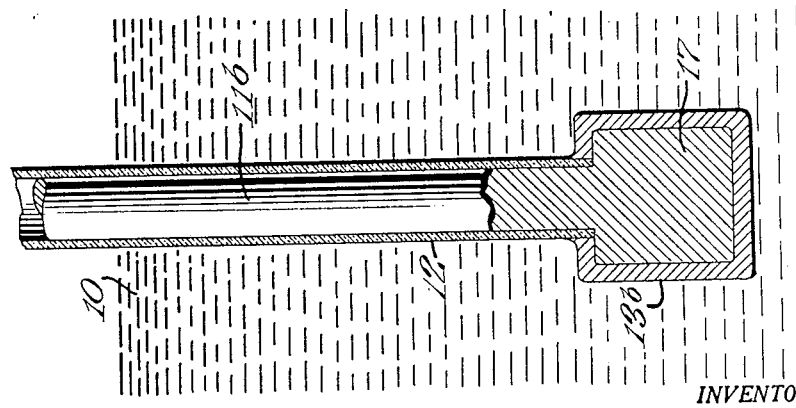
INVENTOR.
Ralph D. Mershon
BY
Cooper, Kent + Dunham
ATTORNEYS.

Patented Mar. 6, 1934

1,949,871

UNITED STATES PATENT OFFICE 1,949,871

ELECTRODE OR TERMINAL FOR ELECTROLYTIC APPARATUS

Ralph D. Mershon, New York, N. Y.

Application March 18, 1933, Serial No. 661,504

9 Claims. (Cl. 175—315)

In the operation of electrolytic rectifiers and condensers, consisting essentially of one or more filmed electrodes immersed in an electrolyte, the filmed parts upon which current is impressed are subject to corrosion at the points where they extend out of the electrolyte. One method of lessening the trouble and expense incident to replacement of the corroded electrodes is to submerge the latter wholly in the electrolyte and connect them to the external circuit by filmed leads so that the corrosion at the electrolyte surface will be confined to the leads, which are cheap and easily replaced. Going farther, it has been found that corrosion of the leads themselves can be entirely prevented by a construction in which the leads may project out of the electrolyte and yet not be in contact therewith at the surface. This construction is described in my prior Patent No. 1,572,404, issued February 9, 1926, which illustrates, as one embodiment of the invention a terminal in which the lead extends from the electrolyte into the submerged end of an insulating tube of glass or porcelain, which submerged end is itself closed by a closure of filming metal in hermetic contact with the tube. Preferably the closure is in the form of a cap, cast in place. With that arrangement a perfect hermetic seal can be produced, but shrinkage of the cap in cooling subjects the tube to undesirable compression stresses which may and sometimes do crack the tube.

My present invention is designed to obviate the breakage of the insulating tube, and more generally, to provide an electrode or terminal device for electrolytic rectifiers and condensers which is simple and inexpensive to manufacture and which at the same time effectively prevents the undesirable corrosion of the lead and like parts. These purposes are accomplished by making the insulating tube in the form of a sheath which is impervious to the electrolyte and which is not susceptible to attack by it, and which closely fits the lead or conductor or a metallic tube enclosing the same so that the insulating sheath will be directly reinforced against the stresses exerted on it when the cap or electrode solidifies. A particularly satisfactory terminal device is provided for example, by applying a layer of insulating enamel or the like to a conductor rod or similar member, and then casting the electrode around the coated rod, so as to effect a hermetic seal with the enamel. Electrical connection between the cast-on electrode and the conductor may be had by leaving a portion of the latter free of sheathing, as at its end, for direct contact with the cast-on metal. For superior results in many cases, the several parts should also have a special correlation of their characteristics of thermal activity; these and other features of the invention are hereinafter more fully described in connection with the embodiments shown in the accompanying drawings, in which:

Fig. 1 is a longitudinal side view of one form of the invention, partly in section;

Figs. 2 and 3 are like views, partly in section, of other forms of the invention, in which the conductor member has a tapered lower portion;

Figs. 4 and 5, partly in section, similarly illustrate other embodiments, in which the conductor member has an enlarged portion extending into the electrode body; and Fig. 6, partly in section, is a similar view of another form of the invention.

Referring to Fig. 1, it will be seen that the apparatus includes an electrolyte 10, of suitable composition for devices of the class described, and an immersed electrode therein, having a lead or conductor member 11 which comprises a rod or thick wire, and which has on its outer surface a layer or coating 12 of insulating material, providing a closely fitting sheath for the lead throughout its extent in the electrolytic condenser or rectifier. Cast around the sheathed lead is the electrode cap 13, comprising a body of filming metal, such as aluminum or in some cases rectifying alloy. Where the electrode is, as shown, mounted on the end of the lead, that end may have its transverse surface 14 free of insulating coating, so that the cast-on metal makes the desired electrical contact with the lead at that point.

It is desirable to make the coating 12 relatively thin (in which case, its thickness as shown in Figs. 1 through 6 may be considered as exaggerated for the purpose of clarity), and at the same time both impervious to the electrolyte 10 and unsusceptible to attack by it. Furthermore, particularly good results can be had when the coating is such as to adhere closely to the underlying conductor member or the like, and to retain that adherence or close fit without cracking, under temperature changes occurring in the electrolytic apparatus, and especially under the heating and subsequent cooling incident to casting-on or other application of the electrode 12. Preferably, the sheath or coating should thus have substantially the same coefficient of expansion as the rod or tube on which it is applied, to avoid cracking or chipping and to promote the direct reinforcement afforded by the underlying metal, against compression stresses at all points of occurrence. To these ends the sheath, such as the thin adherent coating 12 in the embodiments illustrated, is preferably of vitreous enamel; in many cases it can be formed effectively by enamelling the rod or tube with any of the well known compositions used, for example, to coat signs, kitchen utensils, and other articles of copper, steel, iron, nickel, etc.

The metal used for the enamelled member, such as the lead in the form of the invention shown in Fig. 1, should have a melting point higher than that of the cast-on aluminum or aluminum alloy electrode, so that it will not be fused by the heat of such molten electrode metal in casting, and it should preferably have a coefficient of expansion no greater, and more advantageously somewhat less, than that of the cast-on metal. The latter will then shrink, as it cools and solidifies, down against the enamel, and at least somewhat up against end surface 14 (see Fig. 1, for instance) or other exposed portion of the lead, whereby the resulting tension in the cast-on metal provides a firm and secure engagement with the enamel and at the same time an effective contact with the lead. In some instances, however, the coefficient of expansion of the coated member may be greater than that of the electrode body, if the sheath, for instance, is otherwise adapted, or the parts otherwise arranged, to provide the desired seal.

The vitreous enamel sheath, as in the devices shown, gives excellent protection against lead corrosion at the electrolyte surface or elsewhere, and against undesired exposure of the underlying metal to the electrolyte. To that end and for greater security, preferably the joint between the electrode and the sheath is, so to speak, amalgamated in nature; in other words, there is an actual surface union between the cast-on aluminum and the vitreous enamel coating, provided by the casting-on process, and affording an electrolyte-proof seal, especially at the circumferential boundary 15.

In the embodiments illustrated in Figs. 2 and 3, the conductor rod 11 has a tapered or conical lower portion 16, about which the enamel coating 12 extends, the electrode body 13 or 13a being cast on over the coating and with its upper boundary 15a substantially below the beginning of the taper, as shown. This tapered construction permits an advantageously small exposed boundary 15a, and in reducing the area of contact between the electrode and the enamel, and in other ways, it affords a secure and crack-proof arrangement; at the same time the conductor rod, in fact the entire terminal, is strong enough to resist undesirable bending or other stresses. It is also of some advantage to make the cast-on cap in spherical or like form, as at 13a in Fig. 3, in order to afford, for example, improved cooperation with the tapered sheathed conductor, or to provide an electrode of small surface area in relation to its mass.

The form of the invention shown in Figs. 4 and 5 includes a lead or conductor rod 11b having an enlarged lower portion 17 extending substantially into the electrode body 13b; the latter may readily be cast in place, as illustrated, around the enlarged portion 17 and the adjacent enamelled part.

The extended and enclosed part of the conductor, e. g. the portion 17, can be conveniently free of the insulating sheath or layer, or it may be partially coated; in any case, provision should be made for electrical connection as desired between the conductor and the electrode body, the structure shown being particularly satisfactory to that end, by reason of contact over the extensive surface of portion 17. With a construction of this sort, especially where the embedded conductor has a coefficient of thermal expansion no greater,—and preferably less,—than that of the cast-on filming metal 13b, compression stresses exerted on the enamel by the cast-on metal as it solidifies and cools are efficiently resisted, or reduced by the rigid conductor portion 17. It will also be noted that for certain purposes the electrode body can be reduced in thickness, and can take the form of a metal sheath about the conductor member, thus providing a strong construction with minimized stress on the insulating sheath during manufacture and use.

As shown in Fig. 5, the lead or conductor may also have a tapered portion 16b, similar in that respect to the structure of Fig. 3, and cooperating with other parts to furnish a secure and satisfactory electrolytic condenser or rectifier terminal.

In the apparatus of Fig. 6, a metallic tube 21 is provided, having an enamel coating 12 directly reinforced thereby, and having the electrode body 13c cast around the lower end and against the enamel. As will be understood, the outside enamel coating 12 affords the desired protection against the electrolyte 10 in which the electrode is immersed; if desired, the enamel may conveniently be carried around the end of tube 21 and over its interior surface, as at 12c. Connection to the electrode 13c can be made with lead 22, which may be insulated from the tube 21, as by the interior enamel coating on the latter; lead 22 accordingly has its lower end embedded in the cast-on electrode metal, which may extend up into the tube, as shown, and the lead is protected from the electrolyte 10 by the enameled tube. In other instances, the tube may itself provide the lead, and the electrode body may be connected to an exposed portion, for example, in a manner similar to that shown in Figs. 1 to 5. The tube may in some cases have a tapered portion for engagement with the electrode member, similar for instance to portion 16 of the rod in Figs. 2, 3 and 5, and means may also be provided, such as part 17 in Figs. 5 and 6, for resisting and opposing compression stresses exerted by the electrode metal 13c.

In the various terminal devices made in accordance with the invention, it is of particular advantage to include an electrode body of aluminum or electrolytic rectifying alloy which is cast directly against the enamel coating of the part such as rod 11 or tube 21, so that an actual union between metal and enamel exists; as mentioned hereinabove, the resulting device is notably firm, and proof against undesired attack from the electrolyte 10. For some purposes, however, a suitable terminal is provided without such actual union; for instance, the metal electrode, shrinking from the molten state and in cooling, may fit the surrounded enamel surface accurately and under pressure at all points of contact, especially when the coating and underlying metal have a smaller coefficient of expansion than the surrounding cast-on metal. Casting-on can in fact be dispensed with in certain cases, and useful joints otherwise obtained, as where the electrode body is merely shrunk on, but of course it is generally important to make sure that the electrolyte will be kept away from the lead in use, especially at the point of emergence of the lead.

It is to be understood that the invention is not limited to the arrangements herein specifically described but can be carried out in other ways without departure from its spirit as defined by the following claims.

I claim:

1. A terminal device for sealing the lead of an electrode in an electrolytic condenser or rectifier, against access thereto by the electrolyte in which the electrode is immersed, including a metallic member having a thin insulating sheath surrounding and closely fitting the member for direct reinforcement thereby, said sheath comprising an adherent coating of enamel, and a body of electrode metal secured to the sheathed member in hermetic contact with the sheath, said electrode metal body and said sheath providing a sealed electrolyte-proof surface for the terminal device when the latter is inserted in the electrolyte.

2. A terminal device for an electrolytic condenser or rectifier, comprising a conductor member, a thin, closely fitting, adherent, insulating sheath around the said member, said sheath comprising an adherent coating of enamel, and a body of electrode metal electrically connected to the member and surrounding the sheath about the connection, said body gripping the sheath in hermetic contact, and said sheath extending over a substantial portion of the conductor free of the electrode body, for preventing access of electrolyte to the conductor.

3. A terminal device for an electrolytic condenser or rectifier, comprising a conductor member, a thin adherent coating of enamel disposed over a substantial part thereof with a portion of said conductor member exposed, and a body of filming metal cast in place against the coated conductor and in electrical contact with the said exposed portion of the conductor, said cast body enclosing the said exposed conductor portion, and gripping the surrounding enamel coating with hermetic contact.

4. Electrolytic apparatus of the condenser and rectifier class, having an electrolyte, and an electrode device extending into the electrolyte, comprising a metallic member having a thin adherent coating of enamel protecting its surface against access of electrolyte, and a body of electrode metal secured to the enamelled member in hermetic contact with the enamel thereon, to provide an electrolyte-proof seal between the filming metal body and the enamel.

5. Electrolytic apparatus of the condenser and rectifier class, having an electrolyte, and an electrode device extending into the electrolyte, comprising a metallic member coated with a thin adherent layer of enamel, and a body of filming metal secured to the enamelled member and hermetically fitting the enamel thereon.

6. Electrolytic apparatus of the condenser and rectifier class, having an electrolyte, and an electrode device extending into the electrolyte, comprising a tubular metallic member having a thin adherent coating of enamel protecting its surface against access of electrolyte, and a body of filming metal secured to the tubular enamelled member in hermetic contact with the enamel thereon and providing thereby a sealed closure for the end of the tubular member within the electrolyte.

7. An electrode device for an electrolytic condenser or rectifier, comprising a metallic member coated with a thin adherent layer of enamel, and a body of filming metal cast in place against a portion of the coated member and gripping the enamel layer with hermetic contact, said layer extending free of the cast-on metal over a substantial portion of the first-mentioned member, for preventing access of electrolyte to the latter when the filming metal body is submerged in electrolyte.

8. An electrode device for an electrolytic condenser or rectifier in which an electrode is supported in an electrolyte, said device including a metallic member having a portion tapered to a reduced cross-section, a thin, closely fitting insulating sheath around the metallic member and its tapered portion, said sheath comprising an adherent coating of enamel, and a body of filming metal surrounding the sheathed member at the said tapered portion and gripping the sheath thereof, with hermetic contact, said sheath extending, free of the filming metal, over a substantial portion of the underlying metallic member, for preventing access of electrolyte thereto on immersion of the filming metal body in the electrolyte.

9. An electrode device for an electrolytic condenser or rectifier, including a metallic member having a thin adherent enamel coating providing an insulating sheath therefor, and a metal electrode member surrounding the first-mentioned coated member and gripping the enamel coating with hermetic contact, and said device also including means comprising a rigid part extending within the electrode member for resisting and reducing compression stresses exerted by said electrode member on the enamel coating.

RALPH D. MERSHON.